United States Patent [19]
Strandine et al.

[11] 3,805,328
[45] Apr. 23, 1974

[54] APPARATUS FOR DISPATCHING POULTRY

[75] Inventors: Eldon J. Strandine; Mitchell W. Panek, both of Chicago; John S. Paige, Brookfield, all of Ill.

[73] Assignee: Swift & Company, Chicago, Ill.

[22] Filed: July 2, 1971

[21] Appl. No.: 159,147

[52] U.S. Cl. .................................................. 17/11
[51] Int. Cl. ............................................... A22c 21/00
[58] Field of Search ............................. 17/11, 52, 12

[56] References Cited
UNITED STATES PATENTS

| | | | |
|---|---|---|---|
| 3,571,845 | 3/1971 | Martin et al. | 17/11 |
| 3,724,029 | 4/1973 | Lewis | 17/11 |
| 3,724,032 | 4/1973 | Harben | 17/52 |
| 3,477,092 | 11/1969 | Simmons | 17/11 |
| 3,707,018 | 12/1972 | Zebarth | 17/45 |
| 3,490,092 | 1/1970 | Harrison | 17/11 |

*Primary Examiner*—Robert W. Michell
*Assistant Examiner*—John F. Pitrelli
*Attorney, Agent, or Firm*—Edward T. McCabe; Charles E. Bouton; Robert E. Blankenbaker

[57] ABSTRACT

Apparatus for killing poultry wherein the head and neck of a suspended fowl are guided into and fixedly restrained in a horizontal alignment while an incision is made through the fowl's brainpan, thereby initiating bleeding of the fowl. Apparatus includes shackle conveyor means, means for guiding and positioning the fowl's neck and head, and cutting means for making an incision.

3 Claims, 3 Drawing Figures

INVENTORS
ELDON J. STRANDINE
MITCHELL E W. PANEK
JOHN S. PAIGE
BY  E.T. McCabe
ATTORNEYS

APPARATUS FOR DISPATCHING POULTRY

Generally, the present invention relates to an improved method and apparatus for dispatching poultry. More particularly, the present invention relates to a method and apparatus for automatically killing fowl by making an incision through the fowl's brainpan.

The conventional method of poultry dispatch involves severing the fowl's jugular vein in order to initiate bleeding of the bird (See U. S. Pat. No. 3,564,646). After the fowl has been sufficiently bled, it is placed in a scald water bath to loosen the feathers. The principal drawback with this method of poultry dispatch is the possibility of contamination of the fowl from the scald water. Dirt and bacteria carried by the fowl, as by the feathers, collect in the scald bath and can contaminate the bird either by contact with the cut flesh or by intake of the scald water through the severed trachae or gullet. Thus it would be an important advance in the art to develop a method and apparatus for dispatching poultry, which method would significantly diminish the possibility of contamination of the fowl by scald water.

Another advantage of the present invention is that it provides a more humane method of dispatch. An incision made through the brainpan (cranium) results in immediate killing of the fowl. On the other hand, the conventional method of severing the fowl's jugular vein results in relatively slow expiration of the bird.

Several prior art patents have set forth the concept of dispatching poultry by means of cutting the arteries carried within the skull of a fowl. For example, in U. S. Pat No. 1,595,307, there is disclosed a device which can be inserted within the mouth of a fowl for crushing the brain thereof, thus severing blood vessels contained therein. Also, in U. S. Pat. No. 2,081,229 there is disclosed another device for insertion within the mouth of a fowl to accomplish severance of arteries carried within the fowl's skull. However, the devices and methods of dispatch disclosed by these prior art patents are much too slow and cumbersome to have any commercial applicability in modern, high-speed poultry processing plants.

It is accordingly a principal object of the present invention to provide an improved method and apparatus for dispatching poultry.

It is another object of the present invention to provide a method and apparatus for dispatching poultry, which method substantially eliminates the possibility of bird contamination by scald water.

It is also an object of the present invention to provide a method and apparatus to effect a more humane dispatch of poultry.

It is a further object of the present invention to provide an improved method and apparatus for automatically dispatching poultry by means of effecting an incision through the fowl's brainpan.

Basically, the present invention contemplates a method of automatically dispatching poultry wherein the bird is suspended by its legs from shackles while the head and neck are fixedly restrained in a substantially horizontal position for dispatch. An incision is then effected through the brainpan (cranium) of the bird, and the dispatched bird is bled before placing it in scald water.

Apparatus for carrying out the method of this invention includes shackle conveyor means for suspending the fowl, guide means for training the fowl's neck and head into horizontal alignment, feed and positioning means for securely restraining the fowl's head in a proper position for cutting, and cutting means for making an incision through the fowl's brainpan.

Further objects and advantages of the present invention will become clear from the following description of the invention taken in conjunction with the drawings, wherein:

FIG. 3 is an end view taken along the cutting plane 3—3 of a portion of the apparatus illustrated in FIG. 2.

According to the method of this invention, live fowl, such as turkeys, chickens, ducks and geese, are suspended by their legs from a shackle conveyor. Often, it will be desirable to immobilize or quiet the fowl prior to suspending same. For example, the fowl may be electrically stunned prior to shackling. Also, a cold treatment method, such as disclosed in U. S. Pat. No. 3,479,688 to Hoersch, may be utilized to quiet the fowl before suspending same from a shackle. Of course, it will be obvious that the fowl could first be suspended, and then immobilized or quieted.

After the fowl is suspended, it is advanced along a defined path. At a suitable point in this path of conveyance the fowl's head and neck are guided into a substantially horizontal alignment. While the neck and head are being held in such horizontal alignment, and while the fowl is still being conveyed along the defined path, the fowl's head is automatically fixedly restrained in a horizontal upright position. An incision is then made through the brainpan of the fowl while its head is securely held in the aforesaid position.

The present invention contemplates making the incision at any desired angle which will result in severance of the major arteries carried within the cranium of the fowl. The incision may be made in a direction perpendicular to the top of the cranium as illustrated by line A—A in FIG. 1. The incision must be deep enough to sever the major arteries contained within the brain. This depth will, of course, depend upon the type of fowl being dispatched; the larger the fowl, the deeper the incision required. Usually, however, an incision of greater than about ¼ inch is required. An incision of from about ⅜ inch to about ¾ inch is suitable for most fowl. It is also important to make the incision sufficiently wide to allow the blood to flow freely from the incision and to reduce clotting in the incision.

Figure 1:
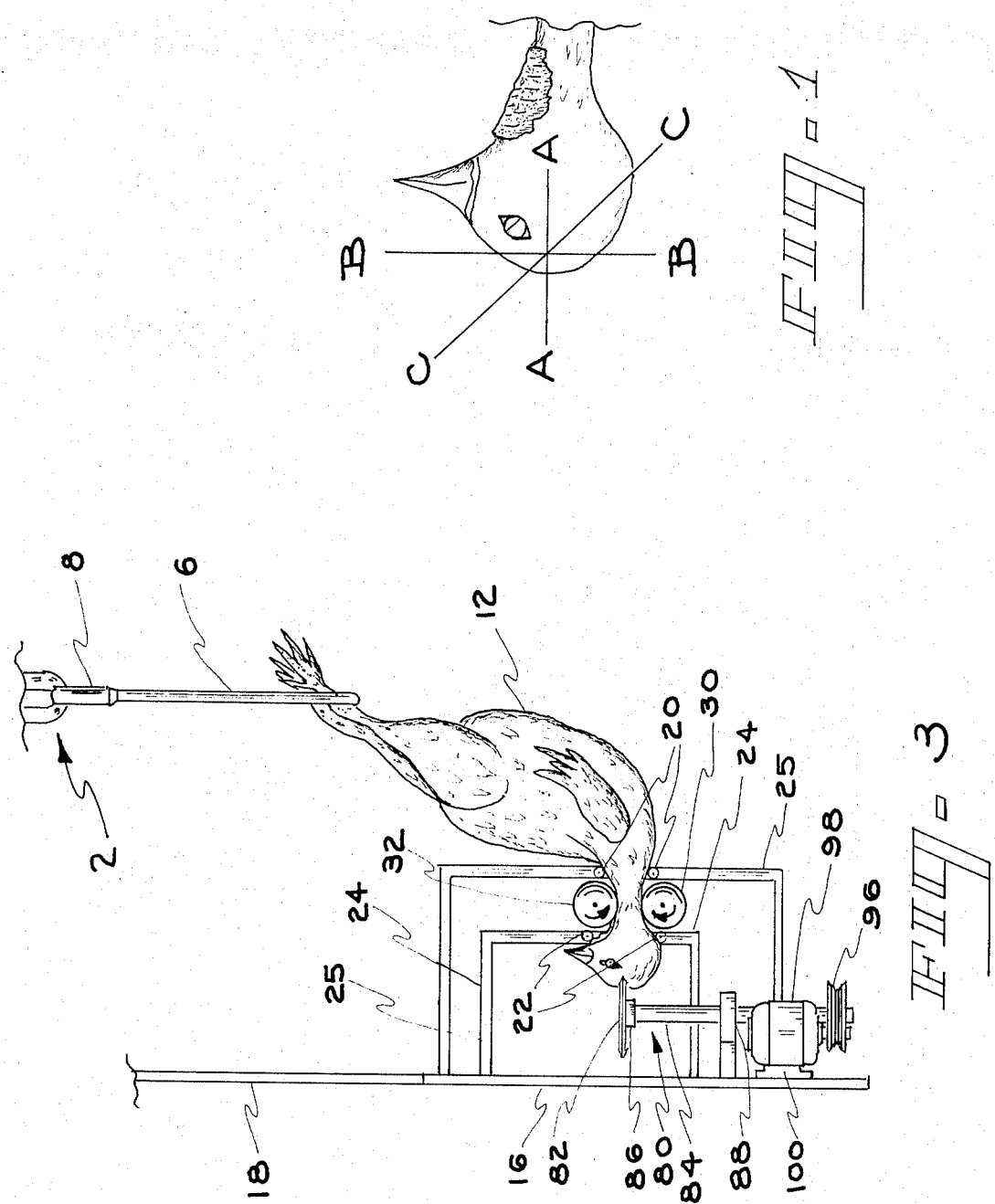
FIG. 1 is a simplified diagram illustrating three possible techniques of making an incision through the fowl's brainpan.

The incision can also be made in a direction parallel to the top of the cranium as illustrated by line B—B in FIG. 1. In this manner, the whole top of the fowl's skull is removed. Again, the point of incision should be located so that the incision is sufficiently deep to sever the major arteries carried in the brain, usually at a depth of greater than about ¼ inch. Also, an incision can be made at such an angle that the posterior portion of the fowl's head is removed as illustrated by line C—C of FIG. 1. After the desired incision has been made, the fowl is allowed to bleed. The fowl is then placed in a scald water bath, and is subsequently dressed, boned and chilled in a conventional manner.

Figure 2:
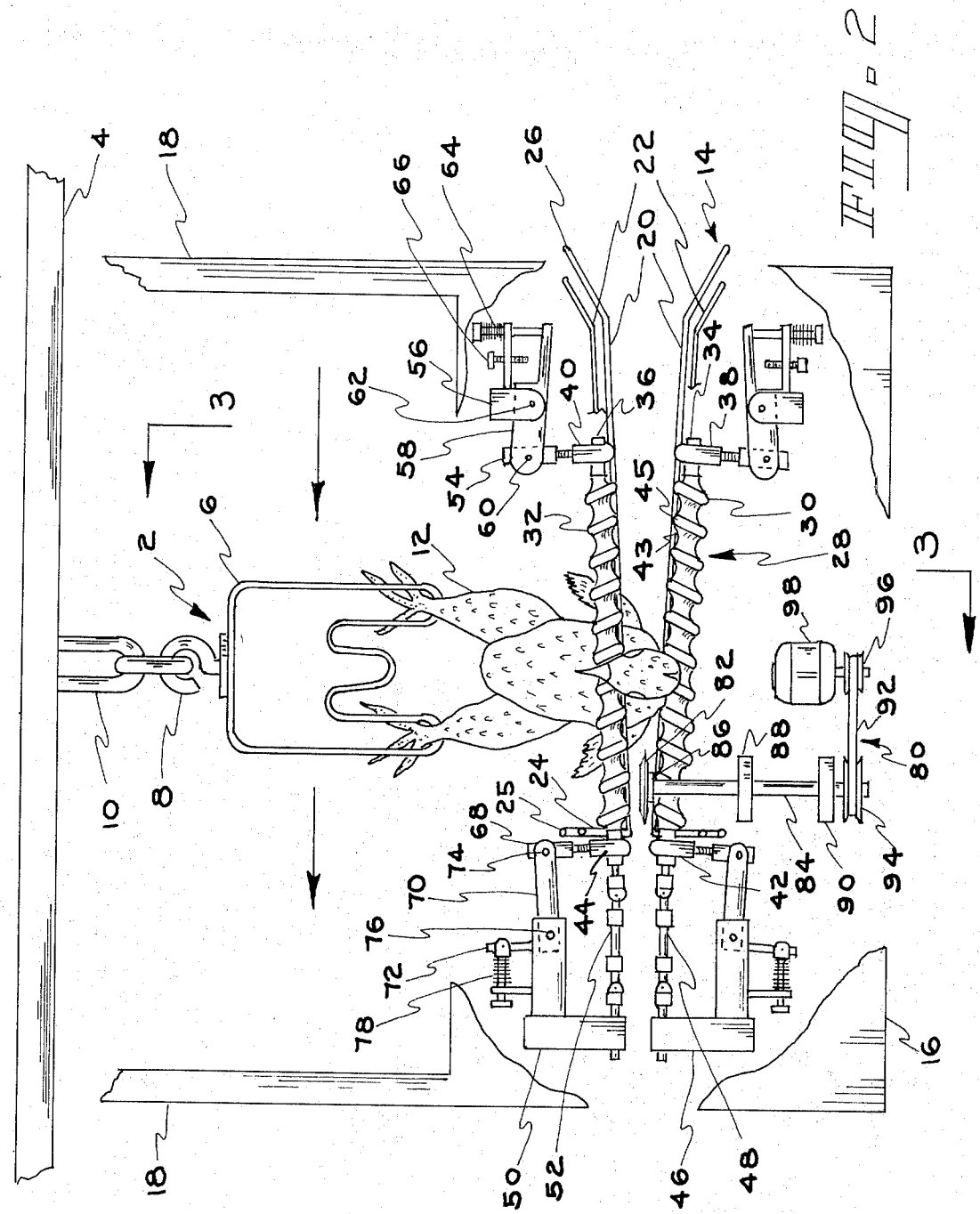
FIG. 2 is a cut-away side view of one embodiment of apparatus suitable for carrying out the present invention.

Referring now to FIGS. 2 and 3, apparatus for performing the disclosed method includes an overhead shackle conveyor means, generally 2, powered by a suitable motor (not shown). Attached to conveyor rails 4 is shackle 6 which is suspended by means of chain 8 fastened to hanger 10. The legs of a fowl 12 are secured in the crooks of shackle 6 so that the fowl is vertically suspended therefrom while shackle 6 and fowl 12 are conveyed from one point to another along a path defined by conveyor rails 4.

A guide means, generally 14, is positioned below said shackle conveyor means 2, and is rigidly mounted on support plate 16 (partially cut away in FIG. 2) which in turn is securely suspended from the ceiling of the plant by steel frame members 18. Guide means 14 includes two opposite pairs of guide bars, outside guide bar pair 20 and inside guide bar pair 22 mounted on support plate 16 by brackets 25 and 24 respectively. The two guide bar pairs are positioned substantially parallel to each other. The guide bars of each pair have vertically flared ends, and the bars converge in the direction of advance of the fowl 12 as shown in FIG. 2. As seen in FIG. 3, guide bar pairs 20 and 22 are horizontally offset from the shackle conveyor means 2. Thus an operator stationed adjacent guide means 14 can grasp fowl 12 when it reaches that point, and lift the neck and head of the fowl into position between flared ends 26 of guide bar pairs 20 and 22. In this manner, as the fowl 12 is conveyed along its defined path, the head and neck of fowl 12 are guided into a substantially horizontal alignment between the guide bars.

The feeding and positioning means, generally 28, includes lower spiralled roller 30 and upper spiralled roller 32. Rollers 30 and 32 are rotatably mounted by means of drive shafts 34 and 36 set in rod end bearings 38, 40, 42 and 44. Rollers 30 and 32 are positioned one above the other between outside guide bar pair 20 and inside guide bar pair 22, and extend horizontally substantially parallel with said guide bars. The leading end of lower roller 30 extends a slight distance above the two lower guide bars, and the leading end of upper roller 32 extends a slight distance below the two upper guide bars. This arrangement insures firm engagement of the fowl's neck by the lower and upper spiralled rollers 30 and 32 once the neck has been aligned by the guide means 14.

Spiralled rollers 30 and 32 may be constructed from any rigid or semi-rigid material, e.g., metal, plastic or hard rubber. Aluminum and stainless steel rollers are particularly satisfactory. The rollers are given a spiralled conformation in order that they can effect a non-slipping engagement with the fowl's neck. The spiral conformation also enables the rollers to propel the fowl's neck forward from the leading end of the rollers towards the trailing end thereof. The amount of rise from roller trough 43 to roller crest 45 is not critical. A trough to crest distance of ¼ inch has been found to be satisfactory.

In one embodiment of this invention the rollers 30 and 32 can be mounted so that they converge slightly from the leading end to the trailing end, as illustrated in FIG. 2. For example, at the leading end of rollers 30 and 32, the average distance of separation between the two rollers may be about 1¼ inches, whereas the average distance of separation between the rollers at the trailing end may be about ¾ inch. Of course, the amount of separation and the angle of convergence will generally be selected according to the type and size of fowl being slaughtered.

Lower roller 30 is rotated by a suitable motor (not shown) which drives appropriate gears (within lower gear box 46) which in turn power lower drive shaft 34 through universal joint 48. Likewise, upper roller 32 is rotated by a suitable motor (not shown) which drives appropriate gears (within upper gear box 50) which in turn power upper drive shaft 36 through universal joint 52. As shown in FIG. 3, spiralled rollers 30 and 32 are rotated in opposite directions: lower roller 30 being rotated clockwise, and upper roller 32 being rotated counterclockwise. Rotation of the rollers in opposite directions acts to take up slack in the fowl's neck skin, thus rigidly locking the fowl's neck and head in a secure horizontal alignment, as illustrated in FIGS. 2 and 3. Also, rotation of the rollers 30 and 32 in opposite directions acts to propel the fowl's neck and head forward towards the trailing end of the rollers.

In a preferred embodiment of this invention, both the leading end and trailing end of each spiralled roller is spring-loaded to allow for vertical biasing of the rollers during operation. Vertical flex could also be achieved by spring-loading only one of the two rollers, or by spring-loading only the leading end of trailing end of each of or rollers. As illustrated in FIG. 2, each of the rollers 30 and 32 are spring-loaded in an identical manner at the leading ends thereof. Linkage elements 54, 56 and 58, along with pivot pins 60 and 62, are operably interposed between rod end bearings 38, 40 and spring biasing members 64, whereby the rollers 30 and 32 can be vertically displaced towards and away from the neck of a fowl interposed therebetween. In this manner, the feeding and positioning means 28 automatically adjusts to handle varying sizes of fowl necks. Lock screws 66 are used to limit the amount of rotation of linkage elements 58, thus imposing a limit on the distance which the leading ends of rollers 30 and 32 can be biased towards each other.

The trailing ends of rollers 30 and 32 are spring-loaded in the same manner as the leading ends. Linkage elements 68, 70 and 72, along with pivot pins 74 and 76, are operably interconnected in order to spring-load the rod end bearings 42 and 44 against spring biasing members 78. The tension of spring members 78 is selected so that the trailing ends of rollers 30 and 32 have a normal spacing suitable for handling relatively small fowl necks. Subsequently, when a relatively larger neck is passed between rollers 30 and 32, the trailing ends will be biased vertically away from each other to allow passage of the neck.

The cutting means, generally 80, is mounted upon support plate 16, and is positioned adjacent the trailing ends of rollers 30 and 32 so that it is operable to make an incision in the cranium of a fowl's head as it is propelled past the cutting means. Cutting means 80 comprises a rotary saw blade 82 mounted so as to be horizontally offset from the feeding and positioning means 28, as shown in FIG. 3. The rotary blade may be positioned to effect any desired angle of incision into the cranium of fowl 12 as its head, held rigidly erect, is conveyed past the blade. Rotary blade 82 is mounted at the end of drive shaft 84 set in bearings 86, 88 and 90. Shaft 84 is rotated by belt 92 trained about sheaves 94 and 96 and powered by electric motor 98 mounted on support plate 16 by means of bracket 100. After an incision has been made through the fowl's brainpan, the fowl is conveyed out of engagement with the rollers, and is subsequently bled and de-feathered.

Obviously, many modifications and variations of the invention as hereinbefore set forth may be made without departing from the spirit and scope thereof, and therefore only such limitations should be imposed as are indicated in the appended claims.

We claim:

1. Apparatus for automatically dispatching fowl comprising: shackle conveyor means for restraining a fowl by its feet while advancing said fowl from one point to another; guide means positioned below and offset from said shackle conveyor means for guiding the fowl's neck into a substantially horizontal alignment; cutting means operably positioned to effect an incision through the brainpan of said fowl; and feeding and positioning means associated with said guide means for securely restraining the fowl's head in an upright position for cutting and for propelling the fowl's head forward into engagement with the cutting means, said feeding and positioning means including a pair of spiralled rollers mounted one above the other and operably positioned to cooperate with said guide means to engage the fowl's neck once the neck has been horizontally aligned by said guide means, the leading ends and trailing ends of said rollers being spring-loaded to provide for vertical biasing of the rollers upon engagement of a fowl's neck.

2. The apparatus of claim 1 wherein the spiralled rollers are mounted in such a manner that they converge slightly from the leading end to the trailing end, thus providing a more restricted passage for the fowl's neck at the trailing end of said rollers.

3. The apparatus of claim 1 wherein the cutting means includes a rotary saw blade mounted adjacent the trailing end of the rollers and offset therefrom.

* * * * *